United States Patent [19]

Rollmann

[11] 4,222,897

[45] Sep. 16, 1980

[54] SORBENT FOR REMOVING METALS FROM FLUIDS

[75] Inventor: Louis D. Rollmann, Princeton, N.J.

[73] Assignee: Mobil Oil Corporation, New York, N.Y.

[21] Appl. No.: 942,252

[22] Filed: Sep. 14, 1978

[51] Int. Cl.$^2$ .................. B01J 27/02; B01J 23/34
[52] U.S. Cl. .................. 252/439; 252/471; 208/253
[58] Field of Search .............. 252/439, 471; 208/253

[56] References Cited

U.S. PATENT DOCUMENTS

| | | | |
|---|---|---|---|
| 2,974,111 | 3/1961 | Nixon | 252/439 X |
| 3,676,369 | 7/1972 | Miale | 252/471 X |
| 4,012,315 | 3/1977 | Heilweil | 208/253 |
| 4,045,331 | 8/1977 | Ward | 208/253 |

*Primary Examiner*—Carl F. Dees
*Attorney, Agent, or Firm*—Charles A. Huggett; Vincent J. Frilette

[57] ABSTRACT

This invention provides a sorbent composition, manganese nodules with occluded sulfur, effective for removing metal contaminants from gases or liquids. It is effective for removing lead contaminant from gasoline and mercury from water or natural gas. It may be used in the chlor-alkali process for cleaning by-product hydrogen. The sorbent also may be used for recovering valuable metals, for example from mine seepage waters.

7 Claims, No Drawings

SORBENT FOR REMOVING METALS FROM FLUIDS

BACKGROUND OF THE INVENTION

1. Field of the Invention

This invention is concerned with a novel sorbent. In particular, it is concerned with a sorbent comprising sulfur occluded in naturally occurring manganese nodules. The novel sorbent is highly effective for removing and/or recovering certain trace metals as more particularly described hereinafter, which metals may be undesirable contaminants in fluids. The sorbent is particularly effective for removing mercury contaminant in a gas stream.

2. Prior Art

Undesirable metal contaminants, more fully described below, are found with reasonable frequency in fluids. The term fluids, as used herein, refers to liquids and gases such as water, gasoline, and other organic liquids, air, natural gas, hydrogen and the like. The metal contaminant often is undesired because of its toxicity and the likelihood that human or animal exposure to it will occur. In other instances, the metal contaminant is undesired because it adversely affects the performance or behavior of the fluid for a particular use. In still other instances toxicity together with other adverse effects dictate removal of the contaminant or at least reduction in the amount present in the fluid.

In the transportation and storage of lead-free gasoline it sometimes happens that lead contamination occurs due to the presence of residues of leaded gasoline in the storage tank, for example. The contaminant will adversely affect the catalytic converter of an automobile and the gasoline thus becomes unsuited for its intended use. U.S. Pat. No. 3,856,664 to Whitehurst describes a method for removing such contaminant by contacting the gasoline with a sorbent consisting of cross-linked polystyrene reacted with sulfur.

Another contaminant which occurs in different environments is mercury. This metal is highly toxic. The "Toxic Substances List" published by the U.S. Department of Health, Education and Welfare, N10SH 76-191 (1976 Ed.) establishes an allowable concentration in air of 0.05 mg/m$^3$ (0.05 milligrams of mercury per cubic meter of air). The vapor pressure of metallic mercury at 25° C. corresponds to a concentration of about 20 mg/m$^3$ in saturated air, which is about four hundred times the safe level.

Gases produced during the smelting of zinc contain toxic levels of mercury.

Certain natural gas fields produce gas that contains significant levels of mercury. The liquified gas from these fields corrodes the aluminum fittings which it contacts.

The chlor-alkali process for the manufacture of chlorine and caustic soda by the electrolysis of brine with the use of a mercury anode presents substantial mercury emissions problems. On decomposition of the amalgam, the by-product hydrogen that is formed is saturated with mercury vapor at elevated temperature and in addition the hydrogen carries with it extremely small particles of the metal itself. Also, the ventilation air stream for the so-called cell end-box and the cell-room ventilation air contain mercury.

Processes for removing mercury contaminant from gas streams have been proposed or are in use. Tubular-type mist eliminators, for example, remove the larger entrained particles of metal, but of course have no effect on the metal vapor. Processes effective for removal of vapor may be preceded by cooling and demisting. Sulfur- or iodine-impregnated activated carbon has been proposed as a sorbent for mercury vapor. See, for example, U.S. Pat. No. 3,194,629 to Dreibelbis et al. U.S. Pat. No. 4,101,631 to Ambrosini et al. Describes a process for removing mercury vapor from gas streams by sorption on a crystalline zeolitic molecular sieve having a $SiO_2/Al_2O_3$ molar ratio from 2 to 20 and loaded with at least 0.5 weight percent elemental sulfur. The above-described sorbents are presumed effective for an extended period of time, i.e. months to years, but are not regenerable. Furthermore, these sorbents are synthetic and relatively costly.

A cyclical process known as the Purasiv Hg adsorption process utilizes a proprietary crystalline aluminosilicate molecular sieve and operates on a short cycle (about 24 hours for sorption) in which it is regenerated at high temperature. This process has been studied in detail in connection with its application in chlor-alkali plants, and the results published in a report entitled "Molecular Sieve Mercury Control Process in Chlor-Alkali Plants", by M.Y. Anastas, U.S. Environmental Protection Agency Report PB 251-203, January 1976, the entire contents of which are incorporated herein by reference.

U.S. Pat. No. 4,093,541 to Piccinini et al. discloses a method for removing metallic mercury from industrial sewage water by adsorption on activated carbon.

Manganese nodules is the descriptive term for a naturally occurring underwater deposit of a rock-like solid. These deposits, found on the floor of bodies of water, contain a high content of manganese mineral associated with other metals including iron, cobalt, nickel, and copper. They are found in abundance in the Atlantic and Pacific Oceans and in Lake Michigan. The nodules are characterized by a large surface area, i.e. in excess of about 100 square meters per gram. They have a wide variety of shapes but most often those from the oceans look like potatoes, while those from bodies of fresh water, such as Lake Michigan, tend to be smaller in size. Their color varies from earthy black to brown depending upon their relative manganese and iron content. The nodules are porous and light, having an average specific gravity of about 2.4. Generally, they range from $\frac{1}{8}$ inch to 9 inches in diameter but may extend up to considerably larger sizes approximating 4 feet in length and 3 feet in diameter and weighing as much as 1,700 pounds. In addition to the metals mentioned above, the nodules contain silicon, aluminum, calcium and magnesium, and small amounts of molybdenum, zinc, lead, vanadium, and rare earth metals.

The manganese nodules substantially as mined, or recovered, from the floor of the body of the water in which they occur, may be used to prepare the sorbent of this invention. Thus, the nodules, as mined, possibly after washing to remove salt and mud or other loose material from the surface of the nodules, may be crushed and sized to obtain a desired particle size.

It is an object of this invention to provide a novel sorbent for removing a metal contaminant from a fluid. It is a further object of this invention to provide a process for removing lead from liquid hydrocarbons. It is a further object of this invention to provide a process for removing mercury contamination from gas streams, particularly from air or from hydrogen. It is a further object of this invention to provide a novel process for recovering valuable metals. Other objects will become apparent to one skilled in the art on reading this entire specification including the claims thereof.

BRIEF DESCRIPTION OF THE INVENTION

It has been now discovered that manganese nodules, mixed with added sulfur, occlude the sulfur on heating with the formation of a gray colored porous solid composition. The transformation that occurs on heating the mixture is not understood, but it is observed that the yellow color of the added sulfur disappears and usually does not reappear on cooling and storage. The product formed is porous and the occluded added sulfur appears to be highly reactive, as will be seen hereinbelow. Whether or not part or all of the sulfur reacts with the minerals in the nodules is not known. The term "occluded sulfur" as used herein refers to the added sulfur after its apparent absorption on heating, usually accompanied by the disappearance of its characteristic yellow color, regardless whether it is present as elemental sulfur or as sulfur compounds or as mixtures thereof.

The porous, solid composition formed on heating manganese nodules with added sulfur is a highly effective sorbent for metals which form a substantially insoluble sulfide, i.e. a sulfide having a solubility product constant in water at about 25° C. of less than about $10^{-20}$. It is a particularly effective sorbent for mercury vapor contaminant in air, helium, nitrogen or hydrogen. Thus, it may be used to remove mercury from such gases.

The sorbent of this invention may also be used to recover dissolved metals such as copper and zinc from waste mine waters.

DETAILED DESCRIPTION OF THE INVENTION

Manganese nodules from any underwater source may be used for the purpose of this invention. The nodules are washed to remove mud and salt and preferably dried prior to mixing with sulfur. The analyses and physical properties of nodules from the Pacific and Atlantic Oceans and from Lake Michigan (Sturgeon Bay), after washing in boiling water, are shown in Table I.

TABLE I

Analyses of Washed Manganese Nodules

| | Pacific (Baja) | Atlantic (Blake Plateau) | Sturgeon Bay (Lake Michigan) |
|---|---|---|---|
| Mn | 23.9 | 20.9 | 9.2 |
| Fe | 15.6 | 13.3 | 35.4 |
| Ni | 0.56 | 0.92 | <0.01 |
| CoO | 0.17 | 0.43 | 0.04 |
| Cu | 0.39 | 0.12 | <0.02 |
| $MoO_3$ | — | 0 | 0.08 |
| Surface Area, m$^2$/g | 327 | 225 | 209 |
| Pore diam., Å. | 53 | 103 | 78 |
| Pore Vol. cc/g | 0.44 | 0.58 | 0.41 |
| Particle density, g/ml | 1.39 | 1.21 | 1.48 |
| Real density, g/ml | 3.55 | 4.06 | 3.70 |
| Pore Size Distribution, % | | | |
| <15Å diameter | 6.6 | 4.5 | 10.9 |
| 15–25 diameter | 12.0 | 9.1 | 11.3 |
| 25–50 diameter | 20.4 | 19.1 | 12.0 |
| 50–100 diameter | 11.5 | 16.0 | 9.6 |
| 100–300 diameter | 8.2 | 10.0 | 8.5 |
| >300 diameter | 41.3 | 41.3 | 47.7 |

The nodules may be classified (i.e. separated into fractions of different particle sizes) by any of several known methods to provide the desired particle size. In some instances the nodules, as mined, will contain a suitably large fraction within a desired particle size range, and this fraction may be separated and used as such. Excessively large nodules may be crushed to about the desired size and the desired size fraction separated by suitable screens. Classification ordinarily will be conducted prior to mixing with added sulfur. It is generally most efficient to conduct the final washing of the nodules on the classified material by contacting with water at a temperature from about 20° to about 100° C., i.e. boiling water.

The particle size of the sorbent useful for the purpose of this invention depends on the particular method to be used for contacting with metal-contaminated fluid. For instance, when the fluid is a gas, a fluidized bed of sorbent may be used, in which case sorbent particles of from about 10 microns to about 90 microns are desired. For fixed bed operation, larger particles from about 200 microns to about 3 centimeters, and preferably from about 0.1 to about 1.0 centimeter, may be used.

It is a feature of this invention that the principal component of the novel sorbent is a naturally-occurring, abundant, porous marine stone of potentially very low cost. Techniques for mining manganese nodules have been developed and this activity is likely to be expanded since the deposits are of potential value as mineral ore. The classified, washed stone is directly usable to prepare the sorbent of this invention, which preparation involves the addition of inexpensive elemental sulfur, and transforming the added sulfur to occluded sulfur by a simple heat treatment.

The washed modules preferably are dried at a temperature from about 100° to 150° C. prior to adding sulfur. The sulfur, preferably elementary sulfur, is added and mixed with the nodules and the mixture is brought to a temperature above about 100° C., preferably from bout 120° to 200° C. and held for a time sufficient to effect the conversion of the added elementary sulfur to occluded sulfur. The added sulfur may be of the rhombic, monoclinic, or "flowers" variety. The conversion may be considered substantially complete when the cooled nodule no longer displays the characteristic yellow color of elementary sulfur. The amount of sulfur added is from about 0.1 wt.% of the dried nodules to about 60 wt. % and preferably the amount is in the range of from about 1 wt. % to about 33 wt. % of the dried nodules. The manganese nodules containing occluded added sulfur is a highly effective porous sorbent as will be demonstrated hereinbelow. The occluded sulfur is highly reactive with sulfide-forming metals dispersed or dissolved in a fluid such as a gas or a liquid.

It will occur to those skilled in the art that the sorbent composition of this invention may be prepared, for example, by depositing sulfur on the dried nodules from a solution of sulfur in an organic solvent, or by reacting hydrogen sulfide with sulfur dioxide sorbed in the pores of the nodules, and by other methods. Whereas these are not preferred methods, the composition formed is likely to be similar or the same as that formed with added elementary sulfur and is contemplated as within the scope of this invention.

The gray colored particulate sorbent of this invention is very effective for removing mercury contaminant from streams associated with the chlor-alkali process.

These gas streams include air used for end-box ventilation, air from cell-room ventilation, and hydrogen from the hydrogen by-product stream. Gas contact time at 25° C. of about one second i.e. at a gas flow rate of 1 volume of gas per volume of sorbent bed per second) is effective to reduce the mercury vapor content of the gas to an undetectable level, i.e. to a concentration of less than 0.05 milligrams of mercury per cubic meter of gas, which is indicative of the unusually high reactivity of occluded sulfur in the sorbents of this invention. The sorbents of this invention are also particularly useful for removing mercury from contaminated natural gas streams. The process of this invention is effective when, in addition to mercury vapor, some of the contaminant is in the form of metallic mist.

The process conditions contemplated for the sorption process of this invention, when the contaminated fluid is a gas, are substantially those conventionally used with other sorbents, i.e. the temperature of contacting may be 0° C. to 120° C., and preferably is about 20° C. to about 65° C. The pressure may be 0 psig (pounds per square inch gage) to 5000 psig, and is preferably 0 psig to about 1000 psig. The contact time in the bed should be sufficient to effect the required degree of removal of contaminant, from about 0.1 second to about 100 seconds, and preferably from about 1 to about 10 seconds. After sorption capacity of the bed is exhausted, the spent sorbent may be treated to recover the sorbed contaminant. In the case of mercury removal, the spent sorbent may be roasted in air to recover valuable mercury metal with or without recovering other metal values.

The sorbent of this invention may be used to treat contaminated liquids, such as industrial sewage water that contain dispersed mercury, for example, and hydrocarbon liquids including gasoline contaminated with lead. Water contaminated with other metals, such as copper or zinc, may be treated and the copper or zinc recovered from the spent sorbent. The conditions for treatment of a liquid will to some extent be determined by the contaminant and the degree of removal desired. In general, however, the contacting operation with the sorbent will more or less simulate the conditions for ion-exchange in which water is softened by contact with an ion exchanger, i.e. the contact time will be similar. Temperatures ranging from about 0° C. up to the boiling point of the liquid may be used. Adjuvants such as oxidizing agents may be used in certain instances to facilitate metal removal. Air or hydrogen peroxide, for example, may be of use in removing zinc from zinc solutions. In unusual instances, a reductant such as hydrogen gas may aid in sorption of the metal.

In general, it is contemplated to use the sorbent of this invention to remove or recover from a gaseous or liquid fluid concentrations of less than 0.1 weight percent of any element that forms a highly insoluble sulfide. In particular, the preferred contemplated metals are those that form a sulfide having a solubility product constant of less than about $10^{-20}$ at about 25° C. Solubility product, as the term is used herein, means the product of the concentrations expressed as mols per liter of solution of the ions of the metal sulfide in a saturated solution of that sulfide in distilled water at 25°C. Some of the elements that form such sulfides are antimony, arsenic, silver, bismuth, cadmium, cobalt, copper, iron, mercury, lead, polonium, tin, tellurium, thallium, uranium, vanadium and zinc.

It is a feature of this invention that the novel sorbent may be prepared using simple process steps and inexpensive materials. In most instances the fact that the sorbent particles may be somewhat irregular in shape is of no consequence. However, there may be applications for which highly regular particles are desired. For such cases the nodules may be crushed to form a powder, and the powder formed into pellets, or the powder may be mixed with a binder and compressed, extruded, or otherwise treated to form regularly shaped pellets or beads. Such techniques for forming regular particles from powders utilizing clay or other matrix materials are well known in the catalyst art and are described, for example, in U.S. Pat. No. 4,049,573 to Kaeding, the pertinent portions of columns 10 and 11 thereof being incorporated herein by reference. The powdered nodules are converted to the sorbent of this invention by the addition of sulfur and further treatment as hereinabove described either prior or subsequent to forming the regular shaped beads or pellets. When a matrix material is utilized, the final shaped particles desirably contain at least 25 wt. % of manganese nodules including occluded sulfur.

The following examples serve to illustrate this invention but are not to be construed as limiting it, the invention being described by the entire specification including the claims. All parts and proportions in the examples are by weight unless explicitly stated to be otherwise.

EXAMPLE 1

This example describes the preparation of the adsorbent of this invention. Manganese nodules, 8-14 mesh, taken from the deposit from Sturgeon Bay, Lake Michigan, were washed with boiling water. Four samples of 6.0 grams each were weighed into porcelain boats and elemental sulfur was added in amounts 0.3, 0.6, 1.2 and 2.0 grams, corresponding respectively to 5, 10, 20 and 33% sulfur to be sorbed into the nodules. Each sample was heated about 1 hour at 150°-175° C. in flowing helium. After treatment all of the four samples showed no evidence of the characteristic yellow color of sulfur; rather, they were a metallic gray color.

In contrast, 5 grams of silica gel combined with 0.5 grams sulfur and similarly heated retained the bright yellow color of bulk sulfur.

EXAMPLE 2

This example illustrates the behavior of manganese nodules for mercury removal prior to conversion of the nodules to the sorbent of this invention.

A bed of about 6 cubic centimeters in volume was prepared by loading 6.0 grams of 8-14 mesh (Tyler Screen Size) Sturgeon Bay nodules into a tube.

Helium was saturated with mercury at 200 psig, 25° C. The saturated stream was found to contain 0.75 mg/m$^3$ (milligrams of mercury per cubic meter of helium). The saturated stream wa passed at room temperature through the bed of nodules continuously at a flow rate of 500 cubic centimeters per minute. The mercury content of the effluent varied with time as follows:

| Time on Stream | Mercury Level |
| --- | --- |
| 15 minutes | <0.05 mg/m$^3$ |
| 50 minutes | <0.05 mg/m$^3$ |
| 65 minutes | <0.05 mg/m$^3$ |
| 120 minutes | 0.18 mg/m$^3$ |

| Time on Stream | Mercury Level |
|---|---|
| 135 minutes | 0.33 mg/m³ |

EXAMPLE 3

The procedure described in Example 2 was repeated except that 8–14 mesh Sturgeon Bay nodules were converted to the sorbent of this invention by adding 5 wt. % of sulfur to dried nodules and heating to 150°C. in flowing helium to form occluded sulfur, and this sorbent substituted for the untreated nodules of Example 2.

After one week on stream no mercury (i.e. <0.05 mg/m³) could be detected in the effluent.

The experiment was coninued for about an additional 40 days but at 20 psig pressure and at a flow rate of 100 cubic centimeters per minute. The contaminated gas contained about 10 mg/m³ of mercury. No mercury was found in the effluent.

What is claimed is:

1. A particulate solid composition comprising manganese nodules and from 0.1 wt. % to about 60 wt. % of said nodules of added sulfur, said added sulfur being occluded in said nodules.

2. The composition described in claim 1 wherein the average particle size is from about 20 microns to 2.5 centimeters.

3. The composition described in claim 2 wherein said added sulfur constitutes from about 1 wt. % to about 33 wt. % of said nodules.

4. The composition described in claim 2 or claim 3 wherein said composition contains at least about 25 wt. % of said nodules with occluded added sulfur.

5. The composition described in claim 2 or claim 3 or claim 4 wherein said manganese nodules are water-washed Sturgeon Bay nodules.

6. A method for preparing a sorbent for metals dispersed in fluids which comprises mixing manganese nodules with from 0.1 wt. % to about 60 wt. % of said nodules of elemental sulfur and heating the mixture to a temperture above about 100° C. for a time effective to form occluded sulfur.

7. The method described in claim 6 including the steps of sizing, washing and drying said manganese nodules prior to said step of mixing with elemental sulfur.

\* \* \* \* \*